(12) United States Patent
Raffegeau

(10) Patent No.: US 7,826,518 B2
(45) Date of Patent: Nov. 2, 2010

(54) METHOD AND DEVICE FOR RECEIVING A DEGRADED RADIONAVIGATION SIGNAL

(75) Inventor: Jean-Pierre Raffegeau, La Haye Fouassiere (FR)

(73) Assignee: MNI, Inc., Santa Clara, CA (US)

(*) Notice: Subject to any disclaimer, the term of this patent is extended or adjusted under 35 U.S.C. 154(b) by 681 days.

(21) Appl. No.: 11/577,322

(22) PCT Filed: Oct. 11, 2005

(86) PCT No.: PCT/EP2005/055169
§ 371 (c)(1),
(2), (4) Date: Apr. 14, 2007

(87) PCT Pub. No.: WO2006/040325
PCT Pub. Date: Apr. 20, 2006

(65) Prior Publication Data
US 2009/0052505 A1    Feb. 26, 2009

(30) Foreign Application Priority Data
Oct. 15, 2004  (FR)  ................................ 04 10953

(51) Int. Cl.
*H04B 1/00*  (2006.01)
*H04K 1/10*  (2006.01)
*H04L 27/28*  (2006.01)

(52) U.S. Cl. ......................... 375/150; 375/140; 375/147
(58) Field of Classification Search ................. 375/140, 375/147, 150
See application file for complete search history.

(56) References Cited

U.S. PATENT DOCUMENTS

| 4,813,006 | A   |   | 3/1989 | Burns et al. |   |
|---|---|---|---|---|---|
| 6,452,961 | B1  |   | 9/2002 | Van Wechel |   |
| 2003/0081660 | A1 | * | 5/2003 | King et al. | .................. 375/150 |
| 2003/0081662 | A1 |   | 5/2003 | Rick et al. |   |
| 2005/0008106 | A1 |   | 1/2005 | Dong-Sik |   |
| 2006/0133463 | A1 | * | 6/2006 | Pietila et al. | ................ 375/150 |

FOREIGN PATENT DOCUMENTS

| DE | 0678806 | * | 10/1995 |
|---|---|---|---|
| JP | 2001-281318 A |   | 10/2001 |

\* cited by examiner

*Primary Examiner*—David C Payne
*Assistant Examiner*—Erin M File
(74) *Attorney, Agent, or Firm*—Greenberg Taurig, LLP

(57) ABSTRACT

The invention relates to a method of receiving a radionavigation signal. Over a first determined time correlations of the sampled signal received are calculated with a locally generated code of period T. The signal is received and the code is shifted with respect to one another from one correlation to the next correlation. Over the determined time, the signal is shifted from one correlation to the next, the code being fixed.

24 Claims, 5 Drawing Sheets

Matched filter with fixed code

METHOD AND DEVICE FOR RECEIVING A DEGRADED RADIONAVIGATION SIGNAL

CROSS-REFERENCE TO RELATED APPLICATIONS

The present Application is based on International Application No. PCT/EP2005/055169, filed on Oct. 11, 2005, which in turn corresponds to French Application No. 04 10953 filed on Oct. 15, 2004, and priority is hereby claimed under 35 USC §119 based on these applications. Each of these applications are hereby incorporated by reference in their entirety into the present application.

BACKGROUND OF THE INVENTION

The invention relates to the reception of a radionavigation signal originating from a satellite-based positioning system such as the GPS system (acronym of the expression "Global Positioning System").

To operate properly, contemporary receivers generally require direct line of sight satellite reception. Positioning rapidly deteriorates especially in terms of accuracy and acquisition time, when reception is disturbed as is the case inside a building or more generally in a degraded environment.

The operation of the GPS system will now be recalled briefly. It consists of a constellation of 28 satellites and of a terrestrial network of reference land stations. Each satellite orbits the earth at 20,000 km with a period of revolution of 12 h. They send two signals, one at 1575.452 MHz for civil applications and the other at 1227.6 MHz for reserved access applications. Hereinafter, only the civil frequency will be considered. The signal sent by a satellite consists of a carrier of frequency 1575.452 MHz, modulated by a known spreading code and possibly by unknown data also called data bits. The satellites all send on the same frequency and the signals sent are differentiated through their code.

These codes have a period T, for example 1 ms and typically consist of 1023 chips.

The positioning of the receiver is obtained by measuring the distance between a satellite and the receiver on the basis of the signal propagation time between this satellite and the receiver. In the receiver, a replica of the code sent is generated locally; the shift between the signal received and the local signal (that is to say the replica) corresponds to the sought-after propagation time. This shift is measured by placing the signal received and the local signal in phase; the criterion of placing in phase corresponds to the maximization of the correlation function of the two signals, that is to say to the search for a correlation peak.

This correlation calculation is generally performed from code half-chip to code half-chip over an integration interval that it is possible to vary. For an integration interval of 1 ms, a correlation calculation time of about 2 s is obtained. (2×1023×1 ms=2 s). This calculation is multiplied by a factor K dependent on the drift of the local clock (or pilot) of the receiver and the number of assumptions about the frequency of the signal to be considered in order to compensate for the Doppler effect. For a clock uncertainty of about ±10 kHz, K=21; a calculation time of about 2 s×21 is then obtained, i.e. 42 s per code, that is to say per satellite.

SUMMARY OF THE INVENTION

In the case of reception in a degraded environment, a solution for obtaining a better signal-to-noise ratio consists in increasing this interval. By taking an interval of 10 ms, about 10 dB is gained, but the calculation then lasts about 20 s multiplied by a factor K≈201, i.e. about 4020 s per satellite. Ultimately only 10 dB has been gained for a considerably increased positioning time.

A solution for reducing this calculation time is to perform the 2×1023 multiplications in parallel instead of calculating them in series as previously. A calculation time over an integration interval of 10 ms of about 2 s (201×10 ms=2 s) is then obtained.

This result is obtained by for example using a correlator structure known by the term "matched filter": the local code is displaced ahead of the signal received at each correlation. This structure in fact comprises two identical sub-structures in parallel, one for the real component of the sampled signal, the other for the imaginary component.

BRIEF DESCRIPTION OF THE DRAWINGS

Other characteristics and advantages of the invention will appear on reading the detailed description which follows, given by way of nonlimiting example and with reference to the appended drawings in which.

DETAILED DESCRIPTION OF THE INVENTION

Figure 1:
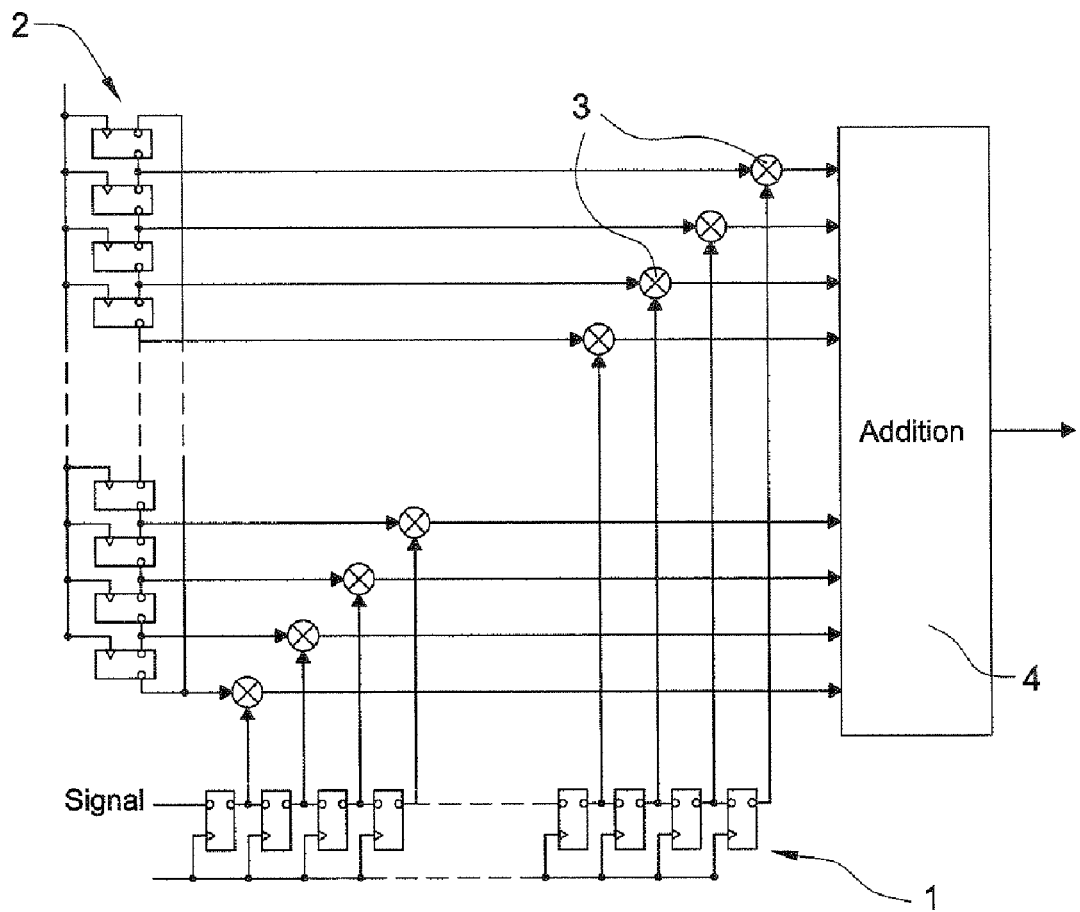
FIG. 1 diagrammatically represents a known correlator of "Matched Filter" type for a component I or Q of the signal, FIG. 2 diagrammatically represents a timechart of the processing of the signal received with rotation of the code, FIG. 3 diagrammatically represents an exemplary correlator according to the invention of "Matched Filter" type for a component I or Q of the signal, FIG. 4 diagrammatically represents a timechart of the processing of the signal received with rotation of the signal, FIG. 5 diagrammatically represents another exemplary correlator according to the invention of "Matched Filter" type in which the two sub-structures are combined, FIG. 6 diagrammatically represents an exemplary, optimization of the example of FIG. 5, FIG. 7 diagrammatically represents an exemplary correlator according to the invention associated with means making it possible to mix coherent integrations and noncoherent integrations.

Hereinafter, the signal received converted into baseband and sampled at N kHz, N being the number of code chips considered over the period of the code, will be called the sampled signal. Here, N=2046=2×1023. The operation of one of these sub-structures will be described in conjunction with FIG. 1.

Figure 2:
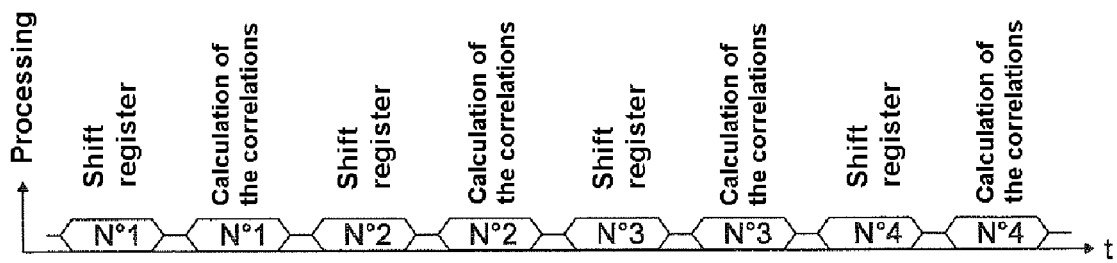

The signal received, whose frequency is compensated so as to take the Doppler effect into account, is loaded into a non-rotating shift register 1 and the code is loaded into a rotating shift register 2. The length N of the shift register represents the number of code chips considered over the period of the code, i.e. 1 ms for example for GPS. To fully load the signal into its shift register 1, it is necessary to wait N clock cycles. This first step of register loading is represented on the time-chart of FIG. 2, by the label "Shift register".

Then the signal remains fixed in its shift register 1 and the code performs N rotations around itself in the rotating shift register 2. A new correlation is calculated for each rotation, by means of N multipliers 3 and of an adder 4 with N inputs. The complete code rotation requires N rotations, i.e. N clock cycles. This second step is represented on the timechart by the label "Calculation of the correlations".

The two steps therefore require 2N clock cycles. They have the same duration. The timechart represents the processing over four code periods for a component, a satellite and a frequency assumption to compensate for the Doppler effect.

To obtain a result in real time, the rotation of the code must be performed at about 2046 times the sampling frequency, this being difficult to implement and requiring a significant number of logic gates.

An important aim of the invention is therefore to optimize the signal processing time to make it possible to increase the integration times and consequently the sensitivity of the receiver, in particular when reception is degraded.

To achieve this aim, the invention proposes a method of receiving a radionavigation signal which comprises over a first determined time a step of calculating correlations of the sampled signal received with a locally generated code of period T, the signal received and the code being shifted with respect to one another from one correlation to the next correlation; the method is chiefly characterized in that, over the determined time, the signal is shifted from one correlation to the next, the code being fixed. This determined time is typically equal to T.

One of the advantages of this method is that it makes it possible to place in parallel two phases of the conventional solutions (input of the signal into a shift register and calculation of the correlations). The signal processing time and hence the satellite search time is thus halved.

This method has another advantage which appears when the signal comprises data (also called data bits) in addition to the code. These data are sent by the satellite for example every 20 ms, that is to say at 50 Hz. When these data change value (for example go from +1 to −1 or vice versa), this manifests itself by a phase inversion in the signal. This phase inversion can occur during the integration interval, when the signal is fixed and the code rotating over this interval. In this case, the calculation of a correlation peak over this interval is difficult or indeed impossible. When, according to the invention, the signal is sliding and the code is fixed over this interval, the phase inversion is necessarily synchronous with the start of the integration interval since it is synchronous with the code which is fixed: the phase inversion then has no impact on the correlations calculated during a code period.

According to a characteristic of the invention, the sampled signal comprising a real component I and an imaginary component Q, the samples of the two components I and Q are placed in series alternately in one and the same memory and the calculations of correlation of the code with I and with Q are performed alternately.

According to another characteristic of the invention, the results of the correlation calculations for the same component and having the same shift n between the signal and the code, and obtained over Tc code periods, are added together so as to obtain for each component a coherent integration respectively called $I_{TC}(n)$ and $Q_{TC}(n)$.

Preferably, a sum of the amplitudes or powers of the coherent integrations having the same shift n is calculated over a time Tnc (Tnc=K×Tc) so as to obtain for each shift n, a noncoherent integration C(n).

According to an embodiment of the invention, prior to the correlation calculations step, the method comprises a step of storing the signal in another memory for a second determined time, according to a writing frequency fe and the signal is read according to a reading frequency fl such that fl>fe.

With this mode of implementation called the post-processing mode, the signal is sampled and saved in memory preferably during the noncoherent time Tnc which may be as much as 16 s; then the same samples are read in memory for each satellite and each frequency assumption. The samples are then read at a frequency fl much greater than their memory writing frequency fe. This post-processing mode makes it possible to reduce the overall satellite search time.

The invention is also aimed at a receiver of a radionavigation signal comprising means for implementing the method.

According to a characteristic of the invention, it is provided with a correlator able to correlate the signal received with a code, and the correlator comprises a nonrotating shift register for the code and at least one nonrotating shift register for the signal.

Preferably, the nonrotating shift register for the code comprises N cells, N being the length of the code, the nonrotating shift register for the signal comprises 2N cells and it comprises N multipliers each linked on the one hand to a cell of the register of the code and on the other hand to a cell of the register of the signal and an adder with N inputs, each input being linked to a multiplier.

Thus, the number of gates for the shift registers of the signal and of the code remains unchanged. On the other hand, the structure now comprises only an adder and a set of elementary multipliers. The silicon area is practically halved and the cost of the circuit is decreased.

According to an embodiment of the invention, it furthermore comprises, linked to the correlator, means able to store the 2N results arising from the correlator and to increment them respectively in tandem with the results provided by the correlator, for a duration Tc, to carry out 2N coherent integrations.

Advantageously, it comprises means able to store the N coherent integration powers or amplitudes, and to increment them respectively for a duration Tnc, as and when the coherent integration powers or amplitudes are obtained, to carry out N noncoherent integrations.

The principle of searching for a correlation peak resides in a series of trials of correlation between the signal and the code by modifying the shift of one with respect to the other. Conventional solutions have opted for the shifting of the code, as illustrated in the preamble. This technique proceeds in two phases. The first phase loads the shift register with the signal over a period of the code. The second phase calculates a correlation at each rotation of the code around itself.

The invention is based on the same correlation principle but adopts the shifting of the signal. From one correlation to the next, the code is now fixed and only the signal is shifted: it slides in its shift register at each clock cycle. The signal slice is always equal to a code period but this slice is sliding.

This correlation method is for example obtained by means of an improved structure of "Matched Filter" type.

According to a first embodiment, there are it in fact two identical sub-structures in parallel, one for the real component of the signal, the other for the imaginary component.

Figure 3:
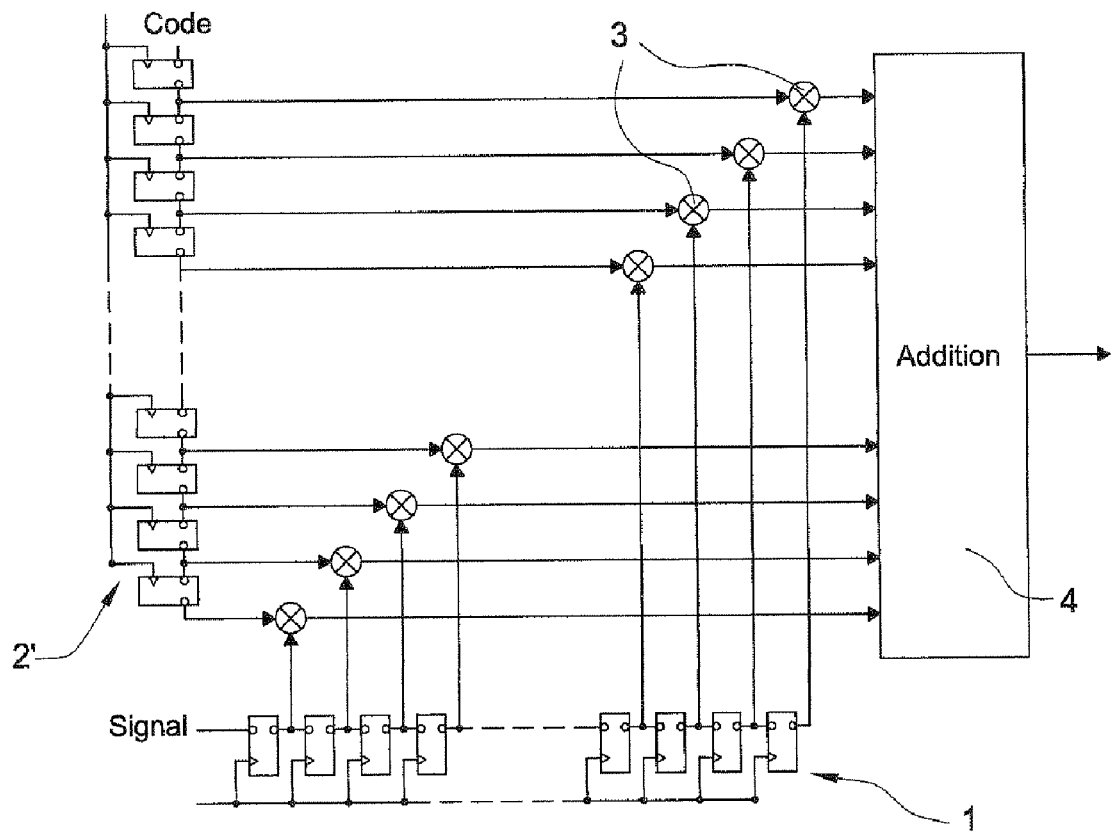

The operation of one of these sub-structures will be described in conjunction with the example of FIG. 3. From one figure to the next, the same elements bear the same references.

The code is input into a nonrotating shift register 2' and the component of the signal compensated for its Doppler is reinput continuously into a nonrotating shift register 1. The length N of the shift register represents the number of code chips considered over the period of the code, i.e. 1 ms for example for GPS. To calculate the whole set of correlations, it is necessary to wait N clock cycles. At each clock pulse, the component of the signal is shifted in the shift register 1 and a new correlation is calculated. After N shifts of the signal, the whole set of correlations over the period of the code is calculated.

Figure 4:
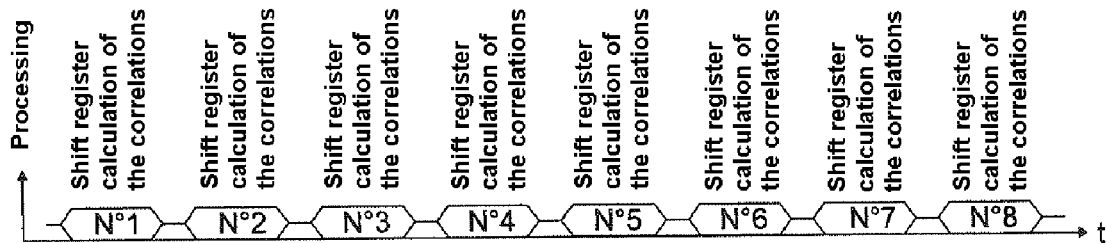

One of the advantages of this correlator resides in placing in parallel the two phases of the conventional solutions (loading of the signal into the shift register and calculation of the correlations). The signal processing time and hence the satellite search time is thus halved, as illustrated on the timechart of FIG. 4 which represents the processing of eight code periods for a component, a frequency assumption to compensate for the Doppler effect and a satellite.

Figure 5:
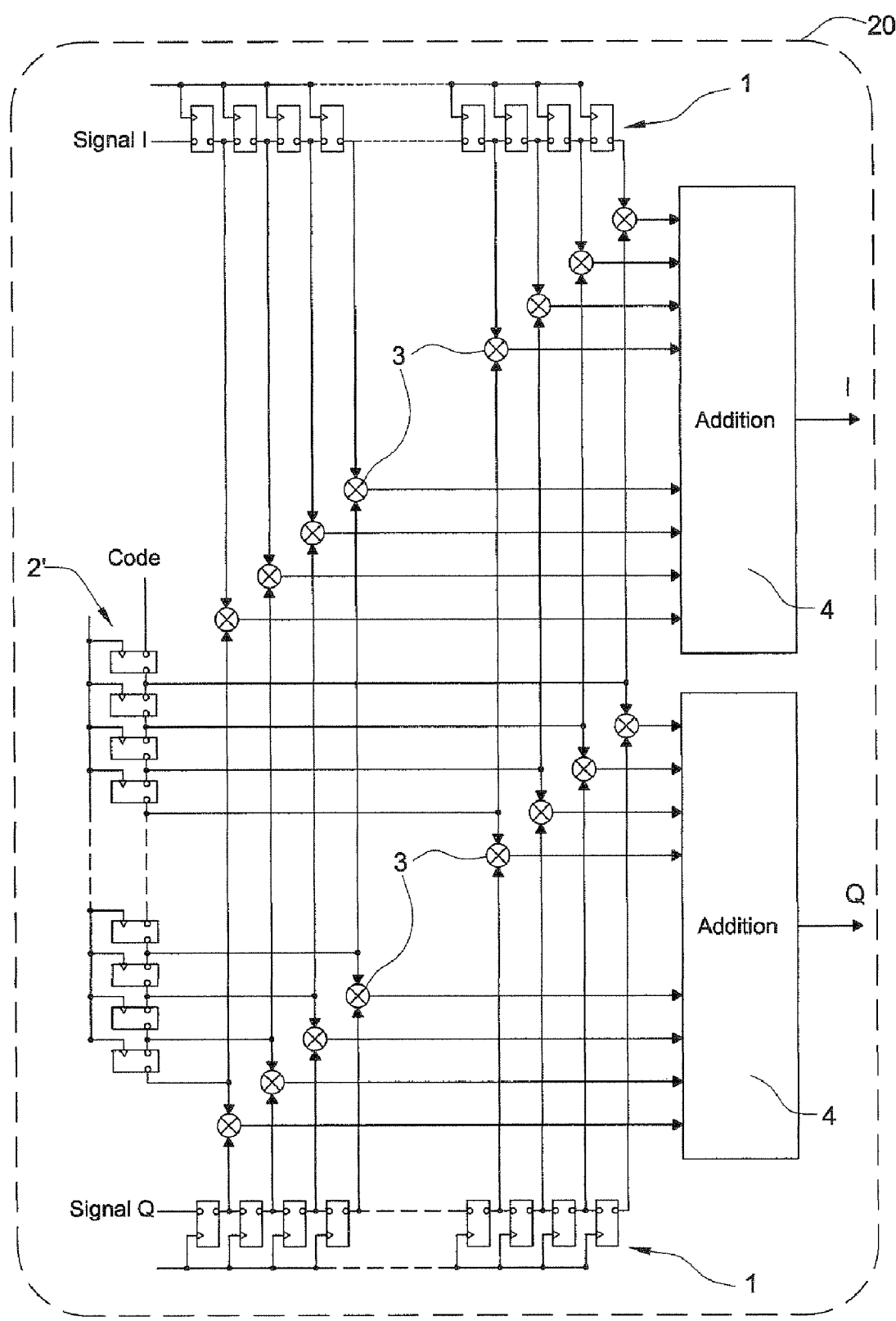

According to another embodiment, the two structures for the real and imaginary components are combined as represented in the exemplary correlator of FIG. 5.

This correlator 20 is provided with a nonrotating shift register 2' for the code, common to the two components, of length N. The other elements were already present in the example of FIG. 3, namely two shift registers 1 of length N (one for each real and imaginary component of the signal), 2N multipliers 3 (N for each component) and two adders 4 with N inputs each (one adder for each component).

An adder requires a very large number of logic gates and constitutes the main silicon area of the invention.

According to a preferential embodiment, the samples of the two real and imaginary components of the signal are stored in series in an alternated manner so as to limit the number of gates required. The number of gates for the shift registers of the signal and of the code remains unchanged. On the other hand, the structure comprises only an adder and a set of elementary multipliers. The silicon area is practically halved and the cost of the circuit is decreased.

Figure 6:
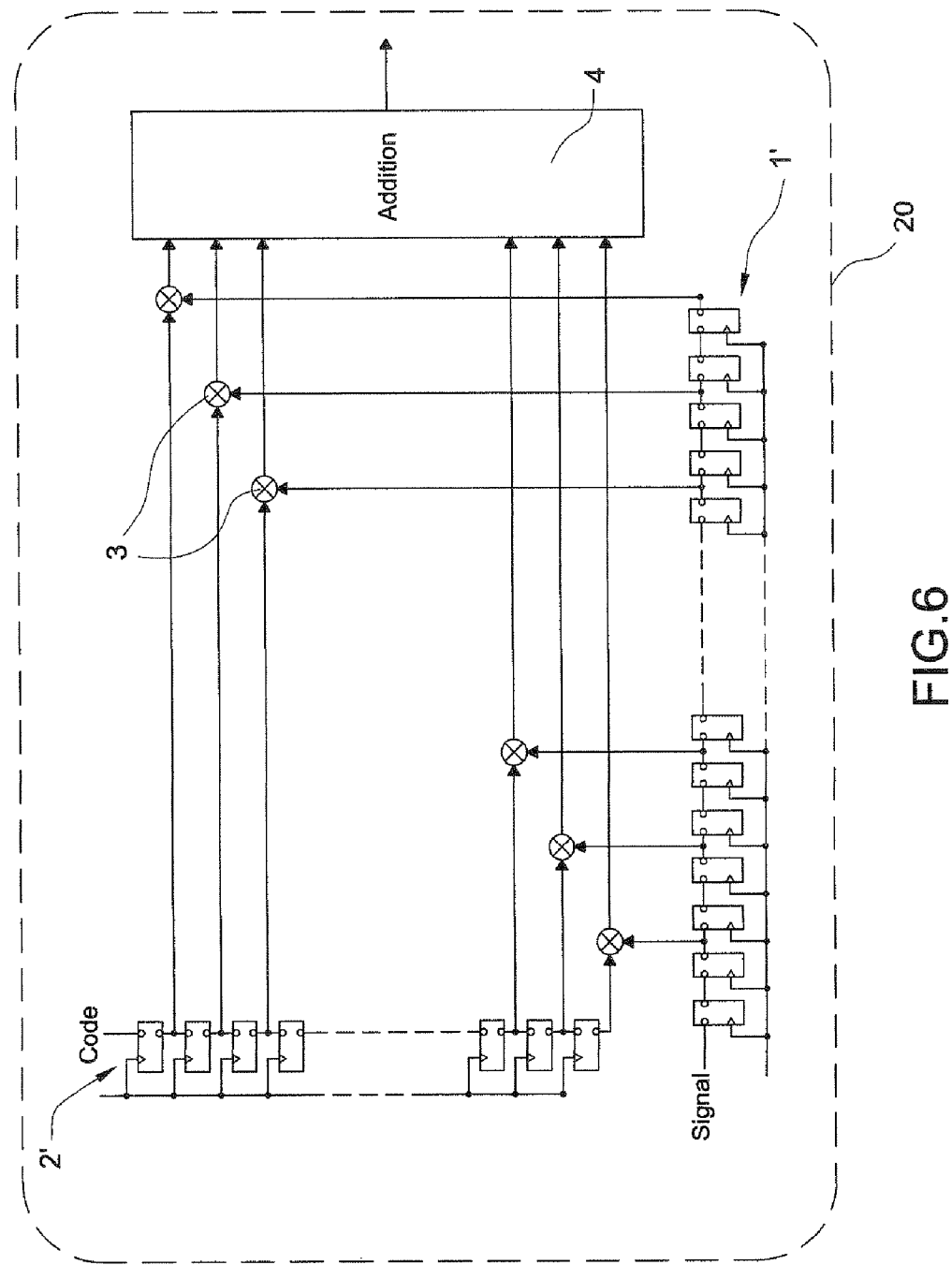

An example of such a correlator 20 is represented in FIG. 6. It comprises a nonrotating shift register 2', of length N for the code, a nonrotating shift register 1', of length 2N for the signal, N multipliers 3 and an adder 4 with N inputs.

The adder 4 makes it possible to obtain the correlations for a component, real or imaginary. Then at the next clock cycle the signal slides in the register 1', being shifted by a cell and the adder 4 then makes it possible to obtain the correlations for the other component and so on and so forth in tandem with the sliding of the signal.

The calculations for N=2046=2×1023 since the correlation calculation is performed from code half-chip to code half-chip will now be detailed in an example. The code chips can be divided by 2 as in this example or by 3, 4, . . . , or indeed even 3.3, etc.

The 2 components, real and imaginary, of the signal are placed in series in an alternated manner in the shift register and can for example be expressed in the following manner:

$SR(2i, t_{k,n})$ are the samples of the real component of the signal at the instant $i \times 1$ ms/2046+$t_{k,n}$, $SR(2i+1, t_{k,n})$ are the samples of the imaginary component of the signal at the instant $i \times 1$ ms/2046+$t_{k,n}$, i the index of the shift register varies from 0 to 2045, $t_{k,n} = t_0 + k \times 1$ ms+$n \times 1$ ms/2046. $T_{k,n}$ represents the (k+1)th code period, n varying from 0 to 2045 and represents the delay index between the signal and the code.

At the (k+1)th code period, the result of the correlation on the real component, provided by the adder for a shift n, is:

$$Code(0)*SR(0,t_{k,n})+Code(1)*SR(2,t_{k,n})+\ldots+Code(2044)*SR(4088,t_{k,n})+Code(2045)*SR(4090,t_{k,n}).$$

Likewise, at the (k+1)th code period, the result of the correlation on the imaginary component, provided by the adder at the following clock cycle, for a shift n is:

$$Code(0)*SR(1,t_{k,n})+Code(1)*SR(3,t_{k,n})+\ldots+Code(2044)*SR(4089,t_{k,n})+Code(2045)*SR(4091,t_{k,n}).$$

The signal generally comprises data (also called data bits) in addition to the code. These data are sent by the satellite for example every 20 ms, that is to say at 50 Hz. When these data change value (for example go from +1 to −1, or vice versa), this manifests itself by a phase inversion in the signal. This phase inversion can occur during the integration interval, when the signal is fixed and the code rotating over this interval. In this case, the calculation of a correlation peak over this interval is difficult or indeed impossible. When, according to the invention, the signal is sliding and the code is fixed over this interval, the phase inversion is necessarily synchronous with the start of the integration interval since it is synchronous with the code which is fixed: the phase inversion then no longer has any impact on the correlations calculated during a code period.

When reception is degraded, the calculation of a correlation peak over a single code period is not possible: this calculation is performed by integrating, over several code periods, the correlations of the same component (real or imaginary) and of the same shift between the signal and the code. It is possible to perform an integration termed coherent over a coherent time Tc or an integration termed noncoherent over a noncoherent time Tnc.

Figure 7:
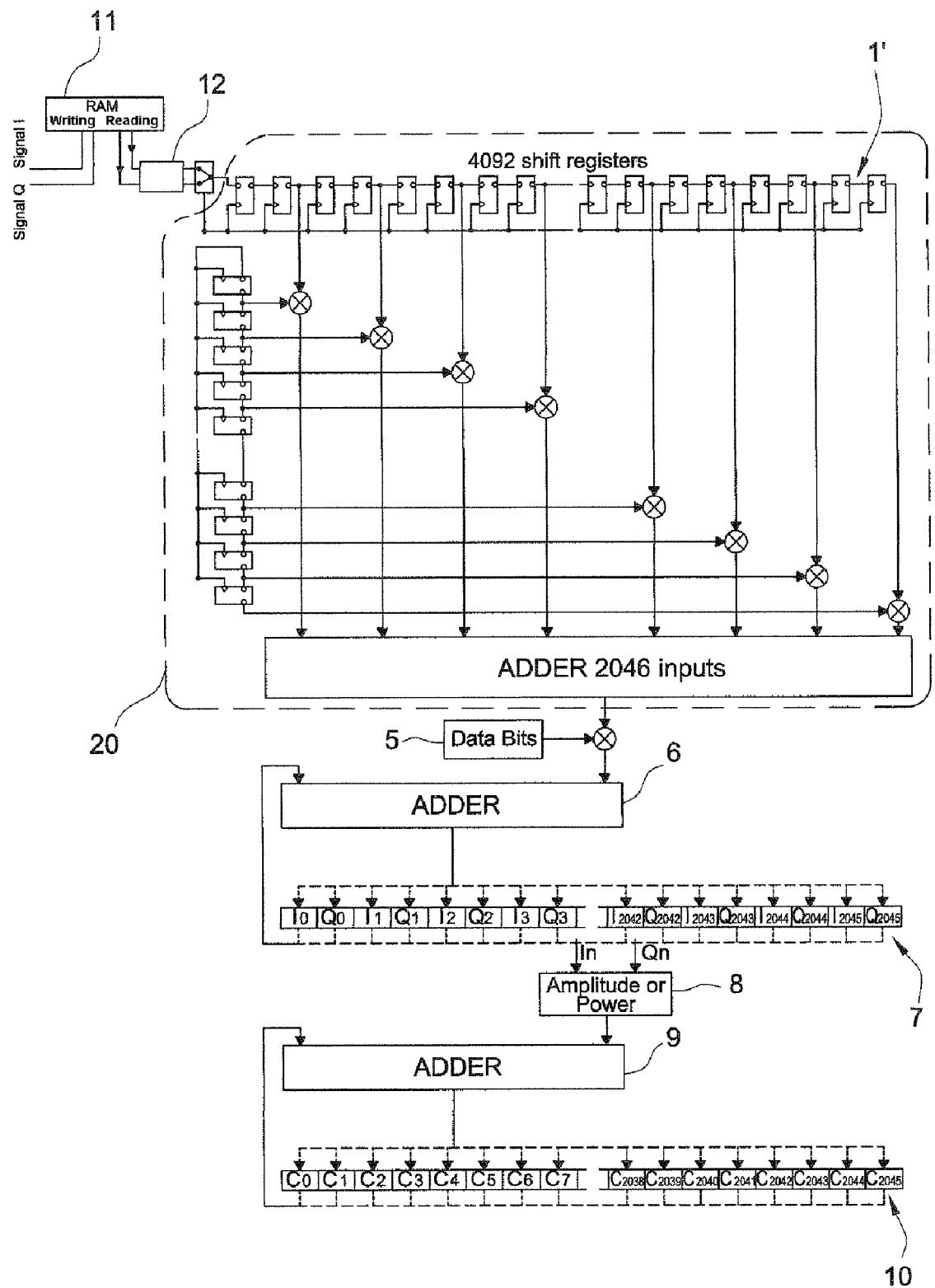

If a phase inversion due to a data bit modification occurs during the coherent time, it may be difficult or even impossible to detect the correlation peak. The coherent integration requires the consideration of the phase of the data bits by means of a known device 5 represented in FIG. 7: the result of each correlation is multiplied by ±1 according to the value of the data bit over the code period during which the correlations are performed.

The feature of coherent integration is to preserve the phase information of the signal. Coherent integration with the consideration of the phase of the data bits is the most efficacious signal processing in terms of detection sensitivity. A significant coherent time permits a narrow bandwidth and enables the signal to be made to stand out from the noise. On the other hand, it is not possible to greatly increase the coherent time. The latter is very quickly limited by:

the number of frequency assumptions to be considered to compensate for the Doppler effect, the potential acceleration of the craft, the characteristics and the price of the pilot oscillator in the receiver.

Because of these limitations, the coherent integration is less than 100 ms and more generally fixed at 20 ms, that is to say at the period of the data bits. The reception sensitivity for a coherent time of 20 ms lies around −144 dBm according to the probabilities of absence and of false detections of the radionavigation signal.

According to a preferential embodiment of the invention, a coherent integration over a time Tc is mixed with a noncoherent integration over a time Tnc. This mixing is implemented for example by means represented in FIG. 7.

The method according to the invention proceeds in three steps. The first step calculates a coherent integration over a time Tc with its two components, real and imaginary. The second step calculates an amplitude or a power on the basis of the two components. The third step calculates over a time Tnc the sum of the amplitudes or of the powers having the same shift. The three steps are repeated N times. In our example N=2046.

The coherent integration (1st step) is carried out during a time Tc, a multiple of the period of the code, in this instance a multiple of 1 ms; it is carried out in a separate manner on the two components, real and imaginary. For a shift n between the signal and the code, the coherent integration, I(n, Tc) for the real component and Q(n, Tc) for the imaginary component, yields:

$$I_{n=0}^{2045}(n, Tc) = \sum_{k=0}^{TC-1} \begin{bmatrix} Code(0)*SR(0, t_{k,n}) + \\ Code(1)*SR(2, t_{k,n}) + \ldots + \\ Code(2044)*SR(4088, t_{k,n}) + \\ Code(2045)*SR(4090, t_{k,n}) \end{bmatrix}$$

$$Q_{n=0}^{2045}(n, Tc) = \sum_{k=0}^{TC-1} \begin{bmatrix} Code(0)*SR(1, t_{k,n}) + \\ Code(1)*SR(3, t_{k,n}) + \ldots + \\ Code(2044)*SR(4089, t_{k,n}) + \\ Code(2045)*SR(4091, t_{k,n}) \end{bmatrix}$$

with $t_{k,n} = t_0 + k \times 1 \text{ ms} + n \times 1 \text{ ms}/2046$.

This coherent integration can be obtained by means of a microprocessor or by means of an adder 6 associated with a memory 7 with 2N slots able to be read then written, such as a RAM memory. In a known manner, the memory 7 is read and written in tandem with the results provided by the correlator 20.

An amplitude or a power is thereafter calculated on the basis of the two components of the coherent integrations (2nd step):

$$\sqrt{I(n,Tc)^2 + Q(n,Tc)^2} \text{ or } [I(n,Tc)^2 + Q(n,Tc)^2]$$

This 2nd step is obtained in a known manner by software means or a device 8.

In the prior art, the noncoherent integration consists in calculating, over the period of the code, the amplitude or the power of the correlations on the two components, then in summing them. According to the invention, the noncoherent integration (3rd step) is calculated by performing the sum over a time Tnc which is a multiple of Tc (Tnc=K×Tc), of the coherent integration powers or amplitudes having the same shift. We obtain:

$$C_{n=0}^{2045}(n) \sum_{k=0}^{K-1} \sqrt{I(nk, Tc^2) + Q(n, kTc^2)} \text{ or}$$

$$C_{n=0}^{2045}(n) \sum_{k=0}^{K-1} [I(n, kTc^2) + Q(nk, Tc^2)]).$$

This noncoherent integration can be obtained by means of a microprocessor or by means of an adder 9 associated with a memory 10 with N slots able to be read and written, such as a RAM memory. In a known manner, the memory 10 is read then written in tandem with the results provided by the memory 7.

These three steps are repeated for each shift n, that is to say N times. In our example N=2046.

According to a mode of implementation of the invention, called the real-time mode, the signal is sampled and processed for one satellite and one frequency assumption (considered to compensate for the Doppler effect) at a time. There is no storage of the signal: the samples are used directly for the processing of the signal which lasts Tnc.

According to a preferential mode called the post-processing mode, the signal is sampled and saved in memory 11 preferably during the noncoherent time Tnc which may be as much as 16 s. Then the samples are read in memory for each satellite and each Doppler frequency assumption; that is to say the signals I and Q arising from the memory 11 are converted into baseband and compensated for a Doppler frequency by the element 12 before being inserted into the shift register 1' of the correlator 20. The samples are read at a frequency 11 much greater than their memory writing frequency fe. This post-processing mode makes it possible to reduce the overall satellite search time as is apparent in the following comparison.

We call:

NBSAT: the number of satellites

BPDOPPLER: the frequency band to be considered to compensate for the Doppler effect for the satellite search Tnc: the noncoherent integration time Tc: the coherent integration time K: the ratio of the writing and reading frequencies in post-processing mode Ttr: Real-time global processing time Tpt: Post-processing global processing time.

We have:

$Ttr=NBSAT \times BPDOPPLER \times Tc \times Tnc$ $Tpt=NBSAT \times BPDOPPLER \times Tc \times Tnc/K + Tnc,$ $Tpt=Ttr/K + Tnc.$ Tnc is negligible compared with Ttr/K; we typically have K=25 or more.

In the example described, signals with two states (±1) have been considered; of course, the invention applies in the same way to signals with more than two states.

Hitherto it has been considered that a single code was generated locally. When one wishes to consider other codes, the latter can be considered in series by reprogramming the local code and the associated Doppler frequencies, as and when changing code.

They can be considered in parallel: it then suffices, according to a procedure known to the person skilled in the art, to provide the receiver with parallel structures, that is to say to multiply the structure comprising the correlator (as well as the memory for the post-processing if necessary, and/or the integrators if necessary), by the number of local codes to be considered.

The signal received can be a satellite-based and/or pseudo-lite-based radionavigation signal.

It is for example a positioning signal of GPS (acronym of the expression "Global Positioning System"), or GALILEO type, or any other positioning system.

The invention claimed is:

1. A method of receiving a radionavigation signal comprising the steps of:
over a first determined time, calculating at least one correlation of a sampled signal received with a locally generated code of period T, the first determined time being equal to the period T of the locally generated code, the sampled signal received and the locally generated code being shifted with respect to one another from one correlation to the next correlation over the first determined time, the sampled signal received being shifted from one correlation to the next, the locally generated code being fixed, the sampled signal received comprising a real component I and an imaginary component Q, wherein samples of the two components I and Q are placed in series in an alternated manner in a same memory, the calculations of correlation of the locally generated code with I and with Q being performed alternately, the results of the correlation calculations for the same I and Q component having the same shift n between the sampled signal received and the locally generated code, and the calculation results obtained over Tc code periods;

adding together the results of the correlation calculations for the same I and Q component so as to obtain for each I and Q component a coherent integration respectively called $I_{TC}(n)$ and $Q_{TC}(n)$;

calculating $I_{TC}(n)^2 + Q_{TC}(n)^2$, a sum of the amplitudes or of the powers of the coherent integrations having the same shift n being calculated over a time Tnc (Tnc=K×Tc) so as to obtain for each shift n a noncoherent integration C(n), prior to the correlation calculations step; and storing the sampled signal received in another memory for a second determined time according to a writing frequency fe, the signal being read according to a reading frequency fl such that fl>fe based on the correlation calculations step, wherein the correlation calculations step is carried out for several locally generated codes and the sampled signal received is read for each locally generated code.

2. The method of claim 1, wherein the correlation calculations step is carried out for several frequency assumptions considered to compensate for the Doppler effect and the signal is read for each of these assumptions.

3. The method of claim 1, wherein the second determined time is equal to Tnc.

4. The method of claim 1, wherein the signal received is a satellite-based and/or pseudolite-based radionavigation signal.

5. A receiver of a radionavigation signal comprising means for implementing the method of claim 1.

6. The receiver of claim 5, comprising a correlator able to correlate the signal received with a code, wherein the correlator comprises a first nonrotating shift register (2') for the code and at least one second nonrotating shift register (1 or 1') for the signal.

7. The receiver of claim 6, wherein the first nonrotating shift register (2') for the code comprises N cells, N being the length of the code, the second nonrotating shift register (1') for the signal comprises 2N cells, and the receiver comprises N multipliers each linked to a cell of the first nonrotating shift register (2') of the code and to a cell of the second nonrotating shift register (1') of the signal and an adder with N inputs, each input being linked to a multiplier.

8. The receiver of claim 6, wherein, linked to the correlator, are means able to store a set of 2N results arising from the correlator and to increment the stored set of 2N results arising from the correlator, for a duration Tc, to carry out 2N coherent integrations.

9. The receiver of claim 7, wherein, linked to the correlator, are means able to store the 2N results arising from the correlator and to increment them respectively in tandem with the results provided by the correlator, for a duration Tc, to carry out 2N coherent integrations.

10. The receiver of claim 8, further comprising means for obtaining N coherent integration powers or amplitudes.

11. The receiver of claim 9, further comprising means for obtaining N coherent integration powers or amplitudes.

12. The receiver of claim 10, further comprising means able to store the N coherent integration powers or amplitudes, and to increment them respectively for a duration Tnc, as and when the coherent integration powers or amplitudes are obtained, to carry out N noncoherent integrations.

13. The receiver of claim 11, further comprising means able to store the N coherent integration powers or amplitudes, and to increment them respectively for a duration Tnc, as and when the coherent integration powers or the amplitudes are obtained, to carry out N noncoherent integrations.

14. The receiver of claim 6, further comprising, linked to the correlator, another memory able to store the signal received according to a writing frequency fe and to restore the signal received to the correlator according to a reading frequency fl such that fl>fe.

15. The method of claim 2, wherein the second determined time is equal to Tnc.

16. The method of claim 2, wherein the signal received is a satellite-based and/or pseudolite-based radionavigation signal.

17. The method of claim 3, wherein the signal received is a satellite-based and/or pseudolite-based radionavigation signal.

18. The receiver of claim 7, further comprising, linked to the correlator, another memory able to store the signal received according to a writing frequency fe and to restore the signal received to the correlator according to a reading frequency fl such that fl>fe.

19. The receiver of claim 8, further comprising, linked to the correlator, another memory able to store the signal received according to a writing frequency fe and to restore the signal received to the correlator according to a reading frequency fl such that fl>fe.

20. The receiver of claim 9, further comprising, linked to the correlator, another memory able to store the signal received according to a writing frequency fe and to restore the signal received to the correlator according to a reading frequency fl such that fl>fe.

21. The receiver of claim 10, further comprising, linked to the correlator, another memory able to store the signal received according to a writing frequency fe and to restore the signal received to the correlator according to a reading frequency fl such that fl>fe.

22. The receiver of claim 11, further comprising, linked to the correlator, another memory able to store the signal received according to a writing frequency fe and to restore the signal received to the correlator according to a reading frequency fl such that fl>fe.

23. The receiver of claim 12, further comprising, linked to the correlator, another memory able to store the signal received according to a writing frequency fe and to restore the signal received to the correlator according to a reading frequency fl such that fl>fe.

24. The receiver of claim 13, further comprising, linked to the correlator, another memory able to store the signal received according to a writing frequency fe and to restore the signal received to the correlator according to a reading frequency fl such that fl>fe.

* * * * *